Figure 1:
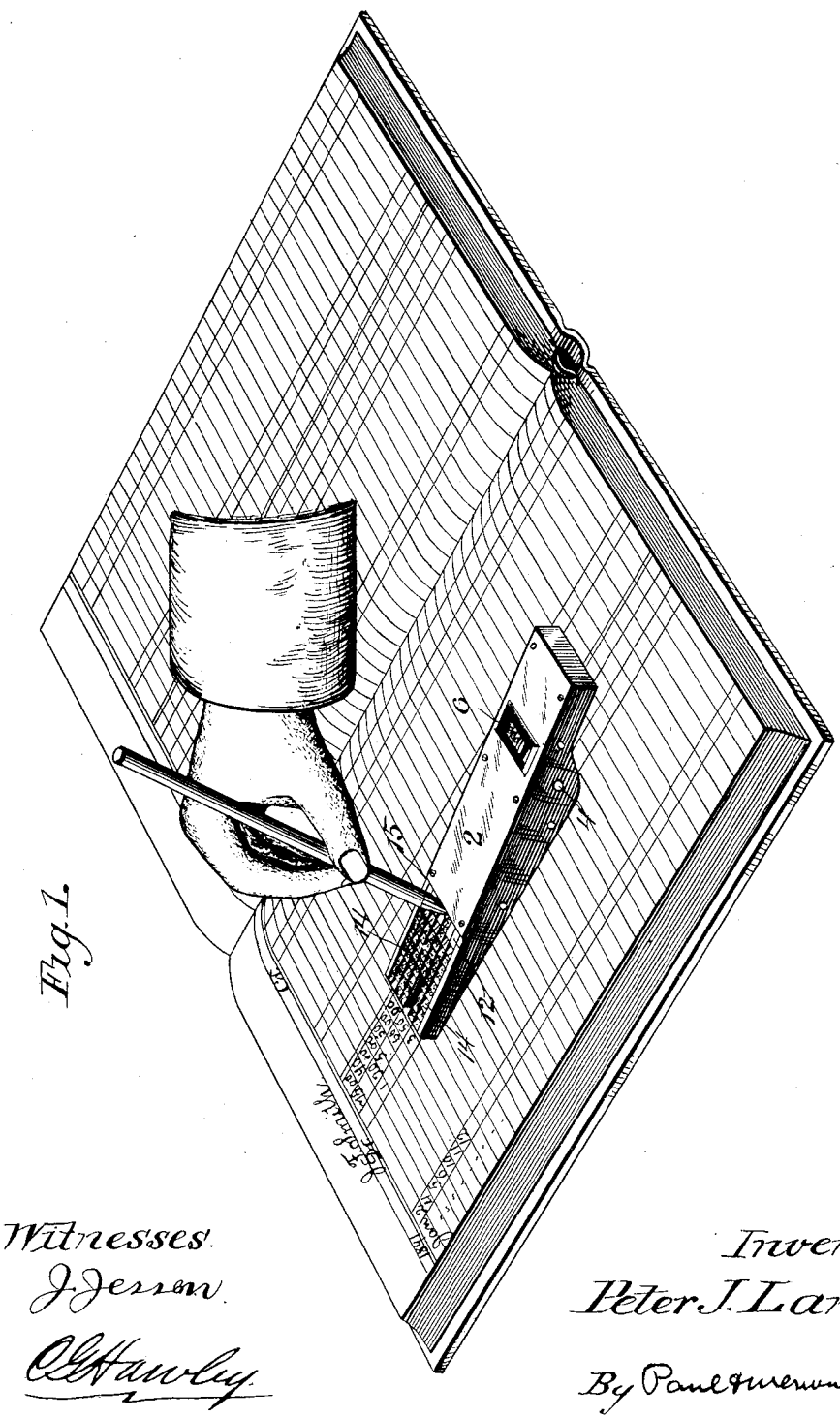

(No Model.)   2 Sheets—Sheet 1.

P. J. LANDIN.
COMPUTING MACHINE.

No. 482,312.   Patented Sept. 6, 1892.

Witnesses:
J. Jensen
O. C. Hawley

Inventor:
Peter J. Landin
By Paul & Werner Att'ys (No Model.) 2 Sheets—Sheet 2.
P. J. LANDIN.
COMPUTING MACHINE.
No. 482,312. Patented Sept. 6, 1892.
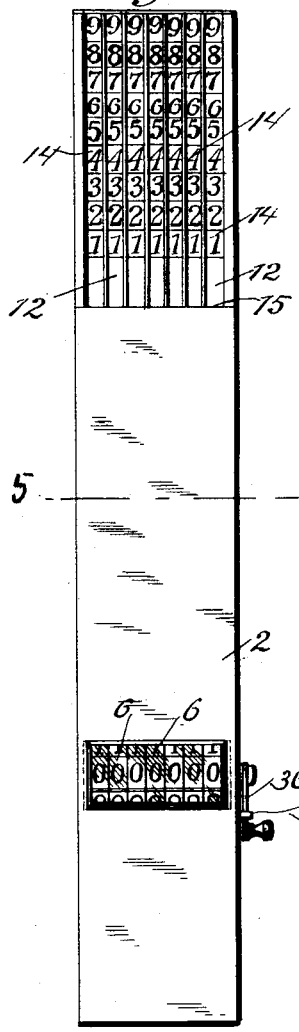
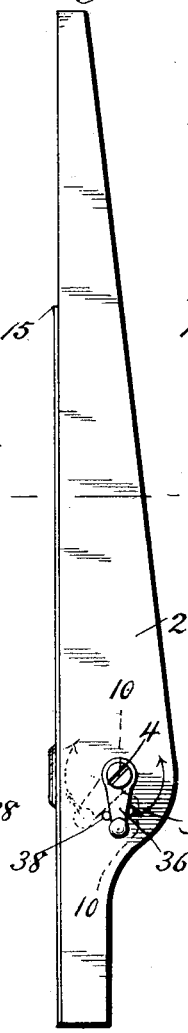
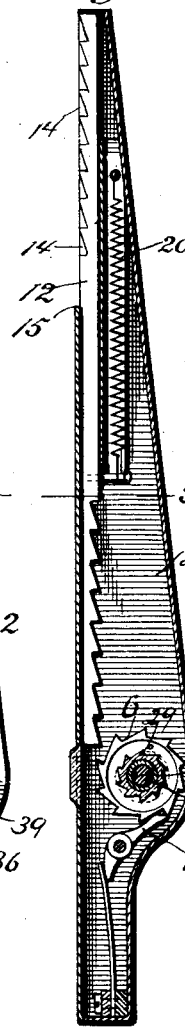
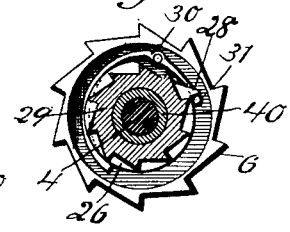
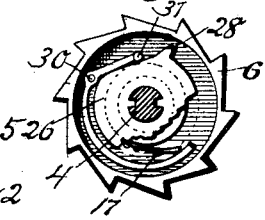
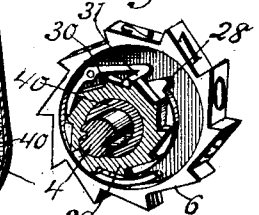
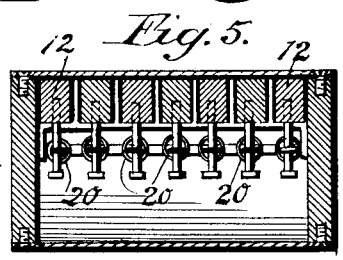
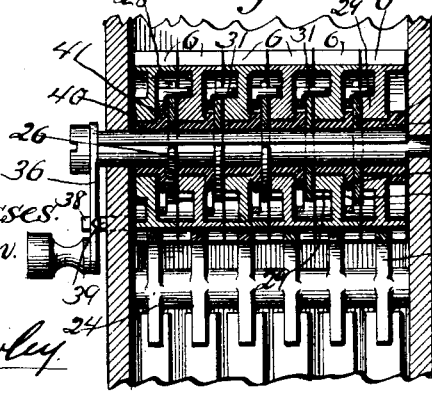
Witnesses:
J. Jessen.
C. C. Hawley.
Inventor:
Peter J. Landin.
By Paul & Merwin

UNITED STATES PATENT OFFICE.

PETER J. LANDIN, OF MINNEAPOLIS, MINNESOTA, ASSIGNOR TO THOMAS B. WALKER AND SARAH E. WILSON, OF SAME PLACE.

COMPUTING-MACHINE.

SPECIFICATION forming part of Letters Patent No. 482,312, dated September 6, 1892.

Application filed February 3, 1891. Serial No. 379,966. (No model.)

*To all whom it may concern:*

Be it known that I, PETER J. LANDIN, of Minneapolis, in the county of Hennepin and State of Minnesota, have invented certain Improvements in Computing-Machines, of which the following is a specification.

My invention relates to improvements in computing-machines; and the object I have in view is to provide a machine of this class which shall be simple in construction and operation and by which arithmetical computations may be made and the result indicated upon the machine.

My invention consists generally in the construction and combination hereinafter described, and particularly pointed out in the claims.

In the accompanying drawings, forming a part of this specification, Figure 1 is a perspective view showing the device in position for use. Fig. 2 is a plan or face view of my machine. Fig. 3 is a side elevation. Fig. 4 is a longitudinal vertical section. Fig. 5 is a cross-section on line 5 5 of Figs. 2, 3, and 4. Figs. 6, 7, 8, and 9 are details. Fig. 10 is a detail section, on an enlarged scale, on line 10 10 of Fig. 3.

In the drawings, 2 represents the frame or case of the machine, which may be of any convenient shape to properly inclose and support the working parts of the machine. A shaft 4 is preferably mounted in the case, and a series of ratchet-wheels 6 are arranged to rotate upon the said shaft 4. The periphery of each of the said ratchet-wheels is preferably divided into ten spaces, forming ten teeth or notches by which the wheel is rotated, and these ratchet-teeth are preferably numbered, consecutively, from "0" to "9."

A series of bars or slides 12 extend longitudinally of the machine. The top forward portions of these slides are preferably provided with a series of openings or notches 14 suitable for the reception of a pin, pencil, the finger of the operator, or other suitable device for operating the slide. Each slide is preferably provided with nine of these openings. The rear end of each of the slides 12 extends over one of the wheels 6, and the under side of the said slide comes in contact with said wheel and is provided with a serrated or toothed portion corresponding with the notches of the wheel 6 both in number and in size, so that as the slide is moved through the machine the wheel will be rotated. The front of the casing 2 is preferably cut away over the ends of the slides, and the edge 15 of this cut-away portion forms a stop against which the operating-pin is brought as the slides are moved, and limits the movement of each of said slides. The notches 14 on each slide are numbered from "1" to "9," beginning with the notch nearest the stop 15.

A suitable spring 20 is secured to a portion of the frame 2, and is attached to each slide 12 in order to retract the slide after it has been moved to operate the ratchet-wheel. Each of the wheels 6 is preferably provided with a spring-stop 24, which is arranged to fall behind the notches in the said wheel and prevent it from receding or turning backward.

Disks 26 are fastened to the shaft 4 preferably by being splined thereto and are located between the wheels 6. A portion of the outer circumference of these disks is cut away, as shown at 27 in Figs. 6, 7, 8, and 9. Each disk is also provided with a lug or projection 28. A ratchet 29, which is preferably made smaller in diameter than the wheel 6, is preferably securely fastened to or made part of each of the said wheels, except the one at the extreme right, and is preferably located in a recess in the side of the wheels, as shown in Fig. 7. Thimbles 40, having collars 41, are arranged on the shaft 4, and on these thimbles the ratchet-wheels are mounted and by them the disks 26 are properly spaced. The disks 26 are slightly larger in diameter than the ratchets 29, except at one point where the disk is cut away, and a dog or pawl 30 is pivoted in the groove or recess in the side of the wheel 6, and this dog is provided with a lug or finger 31, that projects laterally into the groove in the next succeeding wheel. This dog is provided with a spring 17, which tends to throw the end 31 into engagement with the ratchet 29. As the wheel 6 is rotated the pawl 30 moves with it, and when the pawl passes the cut-away portion of the disk it engages the ratchet 29 for the purpose of causing the succeeding wheel to be moved one notch or step. The projection 31 then passes over the lug or projection 28 on the disk which disengages it from the ratchet. The shaft 4 is preferably provided with a handle 36, arranged upon the outside of the casing. A stop-pin 38 is provided which prevents this handle from being moved beyond the pin. A pin 39 is also provided over which the handle is adapted to spring, thereby locking the handle in position against the pin 38, as shown in Fig. 3. As the disks 26 are splined to the shaft 4 they must necessarily be turned with it, and after the device has been used and when it is desired to reset the wheels at zero, the handle is pushed over the pin 39 and moved around until it strikes the pin 38, and then it is moved in the reverse direction. This first movement of the handle brings the projections 28 on the disks 26 into engagement with the pawls 30, thereby causing all of the wheels 6 to be turned and brought to zero.

In using the device where it is desired to add the columns of figures in an account-book the computer is placed upon the leaf of the book at the foot of the column of figures. The width of the slides substantially corresponds with the ordinary spacing of an account-book, so that each slide comes substantially in line with one of the columns of figures. An operating pin or pencil is then placed on the slide, engaging the notch whose number corresponds with the right-hand figure. The slide is then moved until the pin strikes the stop 15, when the right-hand ratchet-wheel will have been moved to a position to show that figure. The pin is then removed and the slide is returned to its normal position by the spring. The pin is then placed upon the next slide, so as to engage the notch whose number corresponds with the next figure in the number to be added, and this slide is operated in the manner already described, and so on until the number has been registered. The machine is then preferably moved to a position beneath the next number and the operation repeated until all of the numbers have been registered. The sum will at any time be visible at the opening in the case.

In my device I provide a machine which can be used with any desired number of columns of figures and with any number of sets or rows of figures, and after each set or number has been added the correct sum will be shown by the device. By this means I am enabled to add and register numbers consisting of three or more figures, each for the purpose of verifying or proving separate entries, and this operation is particularly useful in transferring from a journal to a ledger, where the sum of each entry as it is made may be registered on the machine, and this sum, when the work is completed, should correspond with the journal footings. This is termed "reversed posting."

It may be found desirable for convenience in properly placing the machine to vary the color of the slides. The three center slides may be of different color from the others, in which case the two right-hand slides may be used to indicate tenths and hundredths, or fractions of a dollar. The three center slides will indicate "units," "tens," and "hundreds," and the two slides at the left "thousands" and "tens of thousands." It will be understood, however, that I do not limit myself to this or any particular number of slides, as any desired number of slides and ratchet-wheels may be used. The case in which the device is inclosed is preferably provided with an inclined back or lower surface, and when the device is used in the manner indicated in Fig. 1 it is laid upon the surface upon which the figures are placed, and the ends of the slides are brought close to the surface of the paper. The operator may then easily see both the figure to be added and the slide to be operated.

I claim as my invention—

1. The combination, with a suitable casing, of a series of ratchet-wheels arranged therein and a series of slides arranged in said casing and partially exposed and provided with a series of notches arranged to engage said ratchet-wheels as the slide is moved in one direction and to pass said ratchet-wheels without moving them as the slide is moved in the opposite direction and provided, also, with a numbered series of notches arranged in the exposed portion of said slides and corresponding with the series of notches which engage with the wheels, substantially as described.

2. The combination, with a suitable casing and a series of slides arranged in said casing and partially exposed, of a series of ratchet-wheels arranged in said casing and adapted to be engaged by said slides as they move in one direction and to remain stationary as the slides move in the opposite direction and provided with a series of numbers or figures, and means for automatically retracting said slides after each movement thereof.

3. The combination, with a suitable casing, of a series of ratchet-wheels arranged therein provided with figures or characters and a series of slides engaging said ratchet-wheels and provided with a series of numbered notches or recesses arranged on exposed portions of said slides, whereby as said slides are moved by placing an instrument upon one of the notches the corresponding ratchet-wheel will be moved to register a number corresponding to the number of the notch so engaged and will remain in this position while the slide is returned to its normal position.

4. The combination, with a suitable casing, of a series of ratchet-wheels arranged therein, means for resetting said wheels after each operation, and a series of slides arranged to engage directly with said wheels and turn them as the slides are moved in one direction and to pass without turning them as the slides are moved in the opposite direction and provided with a series of numbered notches arranged outside of said casing, for the purpose specified.

5. In a machine of the class described, the combination of a notched slide provided with a series of numbers, a stop arranged in the line of movement of said slide, and a ratchet-wheel engaged and turned by the said slide as it is moved in one direction and provided with a series of numbers, whereby as said slide is moved to bring any one of its numbers opposite said stop the ratchet-wheel is turned and the same number is registered, substantially as described.

6. In a machine of the class described, the combination, with the casing having an inclined lower wall and an open lower front portion, of a series of slides arranged in said casing and provided with numbered notches arranged opposite the open portion of said casing and a series of registering-wheels arranged in said casing opposite an opening through which the numbers on the wheels may be seen and adapted to be engaged and operated by said slides as they are moved in one direction and to remain stationary as they are moved in the other direction, substantially as described.

7. In a machine of the class described, the combination, with the casing having a portion of its front open, of a series of slides arranged in said casing and having a series of numbers arranged opposite the open portion of said casing, whereby said slide may be moved by the application of a suitable instrument to any one of its notches, springs for returning said slides to their normal positions after each operation, and a series of registering-wheels arranged in said casing opposite a suitable opening and adapted to be engaged and operated by said slide as they are moved in one direction only, substantially as described.

8. The combination, with a series of registering ratchet-wheels, of a series of slides provided with a series of notches corresponding to the ratchet-teeth upon said wheels and adapted to engage and turn said wheels as the slides are moved in one direction, means for preventing a reverse movement of said wheels as the slides are turned in the opposite direction, and a series of numbered notches upon said slides corresponding to the numbers upon said wheels, whereby said slides are adapted to be moved by engaging a suitable instrument with any one of said notches.

9. The combination, with a suitable casing, of a series of ratchet-wheels arranged therein and provided with a series of characters or figures, a series of slides engaging said ratchet-wheels and provided with a series of numbered notches or recesses arranged in portions of said slides that are exposed, means for preventing said wheels from moving in a reverse direction, and means for automatically retracting said slides after each operation, substantially as described.

10. The combination, with a series of registering-wheels and provided with ratchet-teeth or notches, of a series of slides provided with a corresponding series of ratchet-teeth or notches adapted to engage directly with the teeth upon said wheels as said slides are moved in one direction, means for retracting said slide after each movement, and means for preventing a reverse movement of said wheels.

11. The combination, with a casing 2, provided with a shaft 4, of the series of ratchet-wheels arranged upon said shaft and having a figure or character for each ratchet tooth or notch upon each wheel, said wheels being arranged opposite an opening in said casing, a series of slides provided with ratchet-teeth corresponding with the teeth upon said wheels and provided with a corresponding series of numbered notches arranged in a portion of said slides that is exposed, and springs for returning said slides to their normal positions after each movement, and means for preventing a reverse movement of said wheels.

12. The combination, with a series of registering-wheels and means connecting said wheels whereby each wheel is caused to move one notch or space when the next lower wheel in the series moves a complete revolution, each of said wheels being provided with a series of ratchet-teeth or notches, of means for preventing said wheels from moving in the reverse direction, a series of slides, each provided with a series of teeth or notches corresponding with the ratchet-teeth or notches on said wheels and adapted to engage and turn said wheels as the slides are moved in one direction, and means for retracting each of said slides after each movement thereof.

13. The combination, with a series of registering-wheels and means connecting said wheels whereby each wheel is caused to turn one space when the next lower wheel in the series makes a complete revolution, of means for preventing said wheels from moving in the reverse direction, means for simultaneously setting all of said wheels at zero, a series of slides, each provided with a series of ratchet-teeth corresponding to the teeth upon said wheels and adapted to engage and turn said wheels as the slides move in one direction, and means for retracting said slides after each movement.

14. The combination, with a suitable case, of a series of registering ratchet-wheels arranged therein, means connecting said wheels whereby each wheel is caused to move one space as the corresponding wheels make a complete revolution, means for preventing the reverse movement of said wheels, a series of slides, each provided with a series of ratchet-teeth or notches corresponding to the teeth upon said wheels and with a corresponding series of numbered notches arranged in exposed portions of said slides, and means for retracting each of said slides after each movement thereof.

In testimony whereof I have hereunto set my hand this 30th day of January, 1891.

PETER J. LANDIN.

In presence of—
A. M. GASKILL,
BESSIE BOOTH.